(12) United States Patent
Coogan

(10) Patent No.: US 10,458,672 B2
(45) Date of Patent: Oct. 29, 2019

(54) OPTIMIZED ENERGY USAGE IN AN AIR HANDLING UNIT

(71) Applicant: Siemens Industry, Inc., Alpharetta, GA (US)

(72) Inventor: James J. Coogan, Des Plaines, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 120 days.

(21) Appl. No.: 15/856,186

(22) Filed: Dec. 28, 2017

(65) Prior Publication Data

US 2019/0203964 A1 Jul. 4, 2019

(51) Int. Cl.
| | |
|---|---|
| *F24F 11/80* | (2018.01) |
| *F24F 11/46* | (2018.01) |
| *F24F 11/56* | (2018.01) |
| *F24F 11/63* | (2018.01) |
| *G05B 15/02* | (2006.01) |
| *G06F 1/20* | (2006.01) |
| *F24F 140/60* | (2018.01) |
| *F24F 110/10* | (2018.01) |
| *F24F 110/12* | (2018.01) |

(52) U.S. Cl.
CPC .............. *F24F 11/80* (2018.01); *F24F 11/46* (2018.01); *F24F 11/56* (2018.01); *F24F 11/63* (2018.01); *G05B 15/02* (2013.01); *G06F 1/206* (2013.01); *F24F 2110/10* (2018.01); *F24F 2110/12* (2018.01); *F24F 2140/60* (2018.01); *Y02D 10/16* (2018.01)

(58) Field of Classification Search
CPC . G06F 1/20; G06F 1/206; Y02D 10/16; F24F 11/46; F24F 11/56; F24F 11/63; F24F 11/80; F24F 2110/10; F24F 2110/12; F24F 2140/60; G05B 15/02
See application file for complete search history.

(56) References Cited

U.S. PATENT DOCUMENTS

| | | | |
|---|---|---|---|
| 5,344,069 A | 9/1994 | Narikiyo | |
| 6,039,472 A * | 3/2000 | Shlik | G01K 11/22 374/117 |
| 6,684,694 B2 * | 2/2004 | Fujiwara | G01F 1/6845 73/204.26 |

(Continued)

FOREIGN PATENT DOCUMENTS

JP 2014075851 A * 4/2014

OTHER PUBLICATIONS

Kusiak, Andrew, and Mingyang Li. "Cooling output optimization of an air handling unit." Applied Energy 87.3 (2010): 901-909.

(Continued)

*Primary Examiner* — Crystal J Barnes-Bullock (57) ABSTRACT

Rather than complex modeling or time consuming repetitive measuring for optimizing an HVAC system, a slope or change in energy use as a function of a change in a variable (e.g., temperature or humidity) is used to adjust the variable. In an HVAC system, the temperature or humidity of supplied air from the AHU is set based on the derived slope. The energy usage to heat and/or cool supplied air at the terminal units is balanced with the energy usage to heat and/or cool the air to be supplied by the AHU. The slope of the total energy usage may be indicated by a sum of flow rates.

22 Claims, 2 Drawing Sheets

(56) References Cited

U.S. PATENT DOCUMENTS

| | | | | |
|---|---|---|---|---|
| 7,107,835 | B2* | 9/2006 | Korniyenko | G01F 1/6842 |
| | | | | 73/204.22 |
| 8,140,195 | B2* | 3/2012 | Matteson | G06F 1/206 |
| | | | | 700/299 |
| 8,244,502 | B2* | 8/2012 | Hamann | H05K 7/20836 |
| | | | | 703/1 |
| 9,140,503 | B2* | 9/2015 | Milder | F28F 27/00 |
| 9,883,617 | B2* | 1/2018 | Shimizu | H05K 7/20836 |
| 10,120,375 | B2* | 11/2018 | Przybylski | G05B 23/0297 |
| 10,216,212 | B1* | 2/2019 | Gutierrez | G05F 1/66 |
| 10,222,843 | B1* | 3/2019 | Lin | H05K 7/20209 |
| 2003/0109962 | A1 | 6/2003 | Coogan | |
| 2007/0181701 | A1 | 8/2007 | Cheng et al. | |
| 2007/0284431 | A1* | 12/2007 | Pan | G06F 1/20 |
| | | | | 235/375 |
| 2012/0190291 | A1 | 7/2012 | Katz et al. | |
| 2013/0218349 | A1 | 8/2013 | Coogan et al. | |
| 2014/0343731 | A1 | 11/2014 | Brun et al. | |
| 2015/0168977 | A1* | 6/2015 | Oswald | G05B 15/02 |
| | | | | 700/286 |
| 2018/0111503 | A1* | 4/2018 | Araki | B60L 11/1883 |

OTHER PUBLICATIONS

Michael Rosenberg. Onset, H. O. B. O. Data Loggers Analyzing Air Handling Unit Efficiency. Data Loggers. http://www.onsetcomp.com/ retrieved Dec. 18, 2017.

Nassif, Nabil, et al. "Optimization of HVAC control system strategy using two-objective genetic algorithm." HVAC&R Research 11.3 (2005): 459-486.

Wang, Gang, et al. "Air Handling Unit Supply Air Temperature Optimization during Economizer Cycle." University of Nebraska-Lincoln Nebraska USA (2007).

PCT Search Report dated Feb. 28, 2019, for PCT Application No. PCT/US2018/060243, 13 pages.

* cited by examiner

OPTIMIZED ENERGY USAGE IN AN AIR HANDLING UNIT

TECHNICAL FIELD

The present embodiments relate generally to heating, ventilation, and air conditioning (HVAC) systems.

BACKGROUND

To distribute air in an HVAC system, an air distribution system moves and conditions the air. An air-handling unit (AHU) includes heating coils, cooling coils, and fans for mixing outside air, heating or cooling the air, and moving the air to zones, rooms, or other areas local to the occupant space. Terminal units in the zones, rooms, or other areas local to the occupant space also include heating coils, cooling coils, and fans for further heating or cooling the air and outputting the air to the occupant space.

HVAC systems consume significant energy. The amount of energy used depends on the operating state of the system, which includes the operating states of the AHU and terminal units. One optimization technique explicitly calculates the value of a cost function at candidate operating points and selects an operating point that moves the system repeatedly toward a lower cost. Another optimization technique uses a set of heuristic rules that substitute for complete models. In another optimization technique, a mathematical description of the cost function is analyzed to calculate the operating point that minimizes the function. As yet another optimization technique, energy consumption of the various physical components is physically measured at different operating points, and then optimization logic calculates the next operating point by comparing energy consumption at recent operating points. Identifying and using the operating state that minimizes energy use, while satisfying other goals, is valuable, but difficult and often overly complex.

SUMMARY

Rather than complex modeling or time consuming repetitive measuring, a slope or change in energy use as a function of a change in a variable (e.g., temperature or humidity) is used to adjust the variable. In an HVAC system, the temperature or humidity of supplied air from the AHU is set based on the slope. The energy usage to heat and/or cool supplied air at the terminal units is balanced with the energy usage to heat and/or cool the air to be supplied by the AHU. The slope of the total energy usage may be indicated by a flow rate.

In a first aspect, a control system is provided for heating, ventilation, and air conditioning (HVAC). An air-handling unit (AHU) has AHU heating coil and an AHU cooling coil. The AHU is configured to output supply air at an AHU temperature. A terminal unit has a terminal flow rate sensor, terminal heating coil, and terminal cooling coil. The terminal unit is connected with the air handling unit by a duct for receiving the air from the AHU. A controller is configured to receive a flow rate from the terminal flow rate sensor, calculate a slope of power consumption based on the flow rate, and set the AHU temperature based on the slope.

In a second aspect, a method is provided for optimizing heating, ventilation, and air conditioning (HVAC). An amount of air used for heating or cooling for each terminal supplied air by an air handling unit is received. A slope of energy use of the terminals and the air handling unit is calculated as a function of the amounts of air. An air supply temperature or humidity of the air handling unit is adjusted based on the slope.

In a third aspect, a control system is provided for heating, ventilation, and air conditioning (HVAC). An air-handling unit (AHU) has an AHU flow rate sensor, AHU heating coil, and an AHU cooling coil, the AHU configured to supply air at an AHU temperature to terminals. A controller is configured to receive flow rates from the AHU flow rate sensor and from terminal flow rate sensors, calculate a slope of power consumption based on the flow rates, and set the AHU temperature based on the slope.

Other systems, methods, and/or features of the present embodiments will become apparent to one with skill in the art upon examination of the following FIGS. and detailed description. It is intended that all such additional systems, methods, features, and advantages be included within this description, be within the scope of the invention, and be protected by the accompanying claims. Additional features of the disclosed embodiments are described in, and will be apparent from, the following detailed description and the FIGS.

BRIEF DESCRIPTION OF THE FIGURES

The components in the FIGS. are not necessarily to scale, emphasis instead being placed upon illustrating the principles of the embodiments. In the FIGS., like reference numerals designate corresponding parts throughout the different views.

DESCRIPTION OF SOME EMBODIMENTS

Energy use of an AHU system is optimized. A hill climbing technique is used, but rather than calculate an optimum operating point, the iteration is used to repeatedly determine the direction toward a lower cost point and move in that direction. Unlike some hill climbing techniques, this does not require complete calculation of a cost function. Instead, the current slope of cost verses the manipulated variable is used. The slope is the sum of the slopes calculated for each energy consuming component.

In one embodiment, data from the air terminals is collected to determine slopes of energy use verses supply air temperature. The slopes are simple to gather from knowing how much air each air terminal uses and if the air terminal is heating or cooling the air. Knowing the total quantity of air being reheated at the terminals, the dynamic data needed to optimize the system is provided. The conditions at the terminals drive the slope of total energy use. By adjusting the supply air temperature from the AHU based on the slope, a zero or near zero slope region representing optimized energy usage trade-off between AHU and terminal operations is found.

The calculations are simple. Rather than solve a cost function or perform a mathematical optimization to minimize a cost function, the sum of air flow provides a slope of energy usage. The data for the calculations is easily collected from the terminals.

Figure 1:
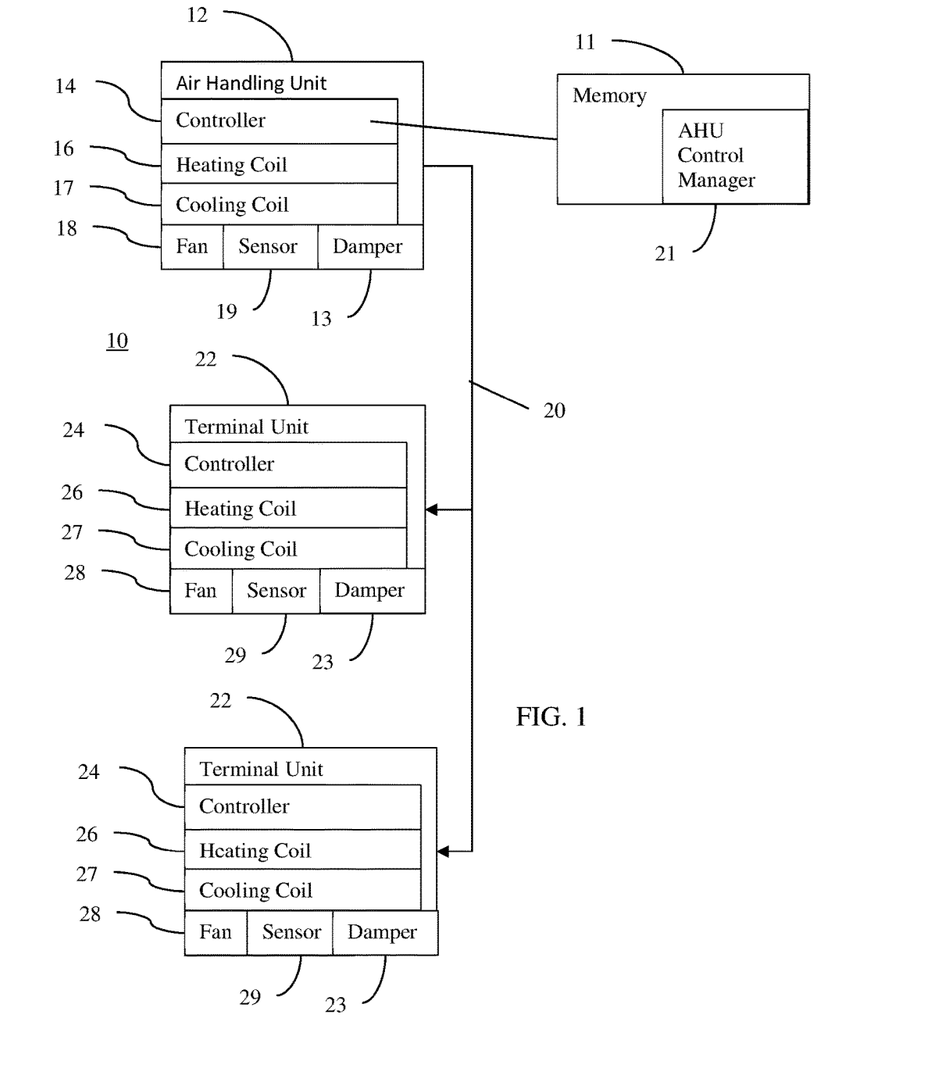
FIG. 1 is a block diagram of one embodiment of a control system for air handling in an HVAC system.

FIG. 1 shows one embodiment of a control system 10 for HVAC. The system 10 optimizes energy consumption as a balance between the AHU 12 and the terminal units 22. The slope of the change in energy consumption as a function of temperature for the system as a whole is used to adjust or maintain the temperature of the air supplied by the AHU 12.

Figure 3:
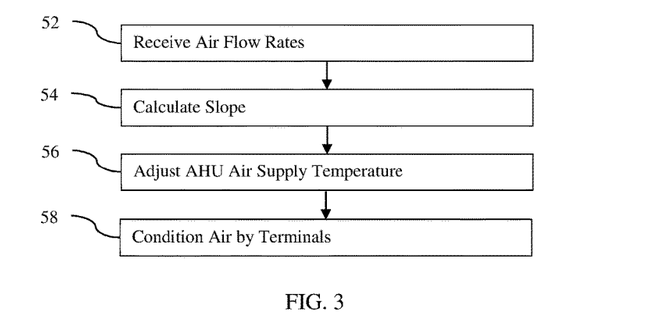
FIG. 3 is one embodiment of a method for HVAC optimization.

The control system 10 implements the methods of FIG. 3. Other methods may be implemented in the control system.

The control system 10 includes an AHU 12, a plurality of terminal units 22, and a network of ducts 20 interconnecting the AHU 12 with the terminal units 22 for air flow from the AHU 12 to the terminal units 22. Additional, different, or fewer components may be provided. For example, any number of terminal units 22 is provided, such as three or more (e.g., tens). As another example, a separate or remote computer or server is provided to integrate with the AHU 12 (such as to the controller 14 of the AHU 12) and/or the terminal units 22, and to calculate the settings and/or slope for optimizing the energy usage of the AHU 12. In yet another example, a wired and/or wireless communications network is provided for transmission of data from and/or between the AHU 12 and/or terminal units 22.

The AHU 12 may be any now known or later developed AHU for residential, industrial, or office use. The AHU 12 mixes air from outside a building or supply air from a heating/cooling source with return air from the spaces where the terminal units 22 are located, conditions the air, and then provides the conditioned air to the terminal units 22. The AHU 12 may be a dedicated outside air system conditioning only outside air for supply to the terminal units.

The AHU 12 includes a return air input, fresh air input (i.e., receive air from outside), air mixing section, filters, one or more cooling coils 17, one or more heating coils 16, dampers 13 or actuators, attenuator, discharge, one or more fans 18, and one or more sensors 19. Additional, different, or fewer components may be provided in the AHU 12, such as more than none heating or cooling coil and/or a heat recovery device. For example, the AHU 12 is a box with a damper, the fan 18, and one or both of heating and cooling coils 16, 17, but with or without filters, mixing section, and/or attenuators. In another example, the sensor 19 as a flow rate sensor is not provided, so the AHU flow rate is determined from the terminal flow rates or other source.

The heating coil 16 and cooling coils 17 are connected by pipes for chilled and heated water supply and return. Heating and/or cooling without water may be provided, such as heating and cooling coils 16, 17 based on chilled and heated air. In another embodiment, the heating coil 16 uses electricity or gas (e.g., a burner) to heat. The cooling coil 17 may use a condenser to chill.

The fan 18 for air distribution is any fan for forcing air to the ducts 20. The fan 18 includes a blade and a motor. Any blade may be used. Any motor may be used. In one embodiment, the motor is a variable drive, such as a variable frequency drive (VFD) that is operatively connected to the controller 14. In response to a control signal, such as in response to a frequency, duty cycle, amplitude, or other signal characteristic, the motor controls the speed of the fan 18. An actuator controls the damper 13 for increasing and/or decreasing the airflow. Alternatively or additionally, change in the speed of the fan 18 causes greater or lesser airflow. The rate of airflow controls the temperature of the air passing from the AHU 12 due to heat transfer. The change in airflow by the fan 18 may be used to more closely regulate temperature downstream of the fan 18 in the air distribution.

The AHU 12 includes one or more controllers 14. The controller 14 is a field panel, processor, computer, application specific integrated circuit, field programmable gate array, analog circuit, digital circuit, or other controller. A single controller 14 is shown, but an arrangement of different controllers may be used. For example, different controllers are provided for different components (e.g., controller for the fan 18 different than the controller for the damper, heating coil 16, or cooling coil 17). The distributed controllers may communicate for interactive control, may be controlled by a master controller, and/or may operate independent of other control.

A memory 11, such as a random-access memory (RAM), read only memory (ROM), removable media, flash, solid state, or other memory, stores instructions used by the controller 14. For example, the memory 11 is a non-transitory computer readable storage medium for storing instructions. When the physical controller 14 executes the instructions, the controls discussed herein are performed. For example, the memory 11 includes instructions for implementing the AHU control manager 21, which calculates the slope and sets the air supply temperature. The memory stores set points, sensor values, control information, and/or instructions for control by the controller 14. Data acquired from the sensors 19, 29, set points, or other operational measures of the AHU 12 may be stored. The stored data is used for controlling operation of the AHU 12, such as for calculating slope and using the slope to set the temperature of the air supplied by the AHU 12 to the terminal units 22.

The sensor 19 is for measuring energy consumption. In one embodiment, the sensor 19 is a flow rate sensor. The sensor 19 is positioned in an air duct to measure the flow rate of air through the AHU 12, exiting the AHU 12, and/or over the heating and/or cooling coils 16, 17. In another embodiment, the sensor 19 is a fan speed sensor, such as an optical sensor or encoder to measure rotation of the fan. In yet another embodiment, the sensor 19 is a strain gauge, contact, or other sensor to measure a position of a damper. Alternatively, the sensor 19 uses settings of the damper position and/or fan speed (e.g., duty cycle or frequency). The energy consumption is measured as a flow rate or amount of air. Any sensor indicting the flow rate may be used, such as adding air flow rates through terminals.

The terminal units 22 receive the conditioned air supplied by the AHU 12 via the ducts 20. The terminal units 22 may heat or cool the air further. For example, the AHU 12 supplies air at 61 degrees. The set point for the air sent to the occupant space is 65 degrees, so the terminal unit 22 heats the supplied air to 65 degrees and then supplies the air to an occupant area or areas. The terminal units 22 include one or more air outputs to one or more rooms.

The terminal units 22 include damper 23, controllers 24, heating coils 26, cooling coils 27, fans 28, and/or sensors 29. Each terminal unit 22 is the same as the other terminal units 22, but arranged to condition air for different zones or rooms. Alternatively, the different terminal units 22 have different capacities, components, and/or capabilities. Similarly, the terminal units 22 are the same or different than the AHU 12, such as having the same components. The same or different types of components noted for the AHU 12 may be used for the terminal units 22.

Each of the terminal units 22 includes a flow rate sensor 29. The same or different flow rate sensors 29 as used for the AHU 12 are provided. The terminal units 22 also include heating and/or cooling coils 26, 27 for heating or cooling the air based on set points for the occupant areas.

The controller 14 of the AHU 12 optimizes the energy consumption of the HVAC system. Other controllers may be used, such as a separate server or computer (e.g., an HVAC workstation or panel) or a controller 24 of a terminal unit 22. The controller 14 is configured by software (e.g., instructions), hardware, and/or firmware to set a temperature or humidity of the supply air provided to the terminal units 22 to optimize the energy consumption.

The controller 14 is configured to gather or collect data from or for the AHU 12 and/or terminal units 22, such as from the sensors 19 and 29. The collected data is also for operation of the AHU 12 and/or may be gathered for other uses. The controller 14 receives the flow rates from the AHU sensor 19 and the terminal unit sensors 29.

A push, pull, or look-up system may be used. In one embodiment, sensor readings are provided regularly or stored in a table and updated if changed. The controller 14 accesses the sensor readings from the local memory. Alternatively, the terminal units 12 are queried when sensor readings are needed.

In one embodiment, the terminal units 22 and AHU 12 are grouped in a communications system using group data exchange. The communications rely on the group labeling, such as the sensor readings for group members being routed to or accessible by a group master. For example, the AHU 12 is a group master where the terminal units 22 are group members. Communications for other groups are not read or used, but communications providing sensor readings for the group are identified. Any header or group labeling may be used. Other communications systems, such as direct connect, bus, or response-query may be used.

The controller 14 is configured to calculate a slope of power consumption as a function of the controlled variable (e.g., supply air temperature) based on the flow rates (referenced herein as "the slope"). Any controlled characteristic of the AHU 12 may be used. For example, the temperature of the supplied air output by the AHU 12 is controlled to optimize the system. Depending on the outside air temperature and the set points for the terminal units, the total power consumption may be minimized. In another example, the humidity of the supplied air is controlled. In the examples below, air temperature is used.

The optimization occurs in an on-going manner. A periodic check may be performed, such as calculating the slope periodically. In one embodiment, the optimization occurs based on a trigger. For example, a change in the outside air temperature and/or temperature set point for one or more terminal units 22 triggers the optimization.

The optimization is a hill climbing optimization. The AHU 12 sets the air temperature of the supplied air based on the slope. After a period, the flow rates are measured again, and the slope calculated again. The air temperature is set again based on the resulting slope. The process continues until a slope of zero or within a threshold tolerance of zero is determined. Alternatively, the slope is calculated, and the temperature set based on the slope without further iterations until another trigger or periodic check is performed.

The optimization determines the conditions to minimize use of heating and cooling in the HVAC system associated with the AHU 12 and the terminal units 22 of the AHU 12. The temperature of air supplied by the AHU 12 to the terminal units 22 is optimized by finding the temperature that minimizes energy used for heating and cooling.

The power consumption assumes that the air flow drawn by the terminal units 22 is not affected by the supply air temperature because the terminal units 22 do not modulate air flow for temperature control. The power consumed by a heating or cooling coil 16, 17, 26, 27 depends on the rate that the coil transfers heat or cold to or from the air stream. The power is assumed to be proportional to the heat transfer rate. The heat transfer rate is proportional to the air flow rate times the change in air temperature effected by the coil. The heat transfer rate is given as: $q=\rho c Q \Delta T$ where $\rho$ is the density, $c$ is the specific heat, $Q$ is the air flow rate, and $\Delta T$ is the temperature change.

Figure 2:
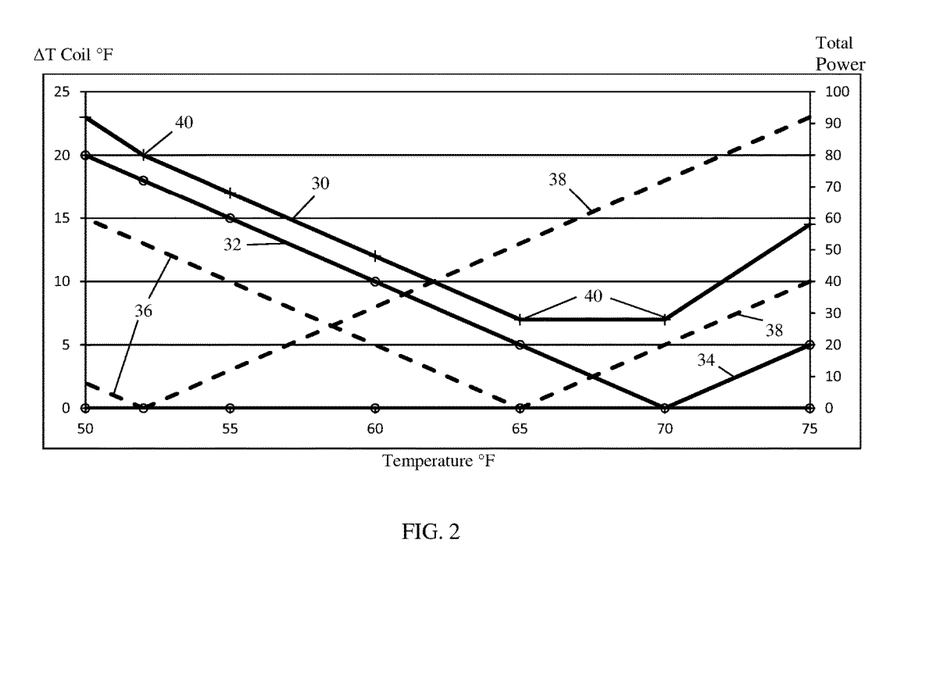
FIG. 2 is a graph illustrating slopes of temperature differential and energy consumption that may be derived and used by the control system in FIG. 1.

The heat transfer rate is used to determine the slope of the power consumption as a function of temperature. The AHU 12 and terminal units 22 each contribute to the total power consumption. FIG. 2 shows an example with one AHU 12 and two connected terminal units 22. The x-axis is temperature. The left-side y-axis is the temperature difference across the coil (heating and cooling coils), and the right-side y-axis is the total power. For the AHU 12, a solid line 32 with a downward slope represents cooling and a solid line 34 with an upward slope represents heating. The line is graphed based on the temperature difference from the outside air temperature. During cooling, the heating slope is 0. During heating, the cooling slope is 0. In the example of FIG. 2, the outside air temperature is 70 degrees, so the cooling line 32 and the heating line 34 form a "V" shape with the inflection at 70 degrees. Similarly, the terminal units 22 having heating lines 36 and cooling lines 38 graphed based on a difference in temperature in set point from the supply air temperature. In the example of FIG. 2, one terminal unit 22 supplies air at 52 degrees to one occupant space, and the other terminal unit 22 supplies air at 65 degrees to another occupant space. The total power consumption line 30 is a sum from the power consumption of the components, so includes inflection points 40 at 52 degrees, 65 degrees, and 70 degrees. The total power consumption line 30 is graphed based on the power scale of the y-axis on the right side.

Table 1 provides the example values for FIG. 2. Table 1 may be generated by the controller of the AHU and stored in local memory based on the data accessed by the AHU controller for calculating the slope as described herein. As shown in Table 1, OAT is outside air temperature, dT is temperature difference, h is heating, c is cooling, the power is the measured air flow, Tdisch1 and 2 are the temperature set points, and Tdisch AHU is the supply air temperature.

TABLE 1

| | OAT 70 | | Ahu flow 3 | Tdisch 1 65 | | T1 flow 2 | Tdisch 2 52 | | T2 flow 1 | |
|---|---|---|---|---|---|---|---|---|---|---|
| Tdisch AHU | dT AHU h | dT AHU c | power | dT h1 | dT c1 | power | dT h2 | dT c2 | power | total power |
| 75 | 5 | 0 | 15 | 0 | 10 | 20 | 0 | 23 | 23 | 58 |
| 70 | 0 | 0 | 0 | 0 | 5 | 10 | 0 | 18 | 18 | 28 |
| 65 | 0 | 5 | 15 | 0 | 0 | 0 | 0 | 13 | 13 | 28 |
| 60 | 0 | 10 | 30 | 5 | 0 | 10 | 0 | 8 | 8 | 48 |
| 55 | 0 | 15 | 45 | 10 | 0 | 20 | 0 | 3 | 3 | 68 |
| 52 | 0 | 18 | 54 | 13 | 0 | 26 | 0 | 0 | 0 | 80 |
| 50 | 0 | 20 | 60 | 15 | 0 | 30 | 2 | 0 | 2 | 92 |

By determining the slope, the temperature of the supplied air from the AHU 12 to the terminal units 22 may be optimized. The optimized temperature is any temperature that results in the total power consumption having a slope of 0. In the example of FIG. 2, the optimized temperature of supply air is between 65 and 70 degrees (see total power consumption line 40 where the slope is 0).

The slope for the total power consumption as a function of air supply temperature is calculated as a sum of flow rates. The sum of slopes from each component is slope of the system 10. The slope for the system at any given temperature is a sum of a heating sum and a cooling sum. The slope is calculated from a heating sum of the flow rates for heating and a cooling sum of the flow rates for cooling. Where heating and cooling occur with a same efficiency, then a sum of all the flow rates regardless of heating or cooling may be used.

For calculating the slope of power consumption 30, the efficiency of operation of the heating coils 16, 26, and cooling coils 17, 27 may be considered. In one embodiment, the heating efficiency is the same for all the heating coils 16, 26, and the cooling efficiency is the same for all the cooling coils 17, 27. The heating sum is a function of a heating efficiency factor, and the cooling sum is a function of a cooling efficiency factor. In other embodiments, the efficiency factors, heating and/or cooling, are different for different coils and/or between the AHU 12 and the terminal units 22. The efficiency factor, e, is likely to be different for heating the system and cooling the system. The efficiency factor, e, may also be different for coils in the AHU 12 than for coils in the terminal units 22. Values of the efficiency factor may be calculated according to the energy processes employed in the system. Default or design-based efficiency factors may be used. A calibration may be used to set the efficiency factor. In alternative embodiments, an efficiency factor is not included in the calculation of the slope.

Adding the efficiency factor, e, for power consumption, p, in the heat transfer rate provides: $p=eq=e\rho cQ\Delta T=e\rho cQ(T_{out}-T_{in})$. The heating, h, and cooling, c, are separated. For the heating coil 26 in terminal unit 22 number i served by the AHU 12 (e.g., number i may be 1 or 2 corresponding to the first or second terminal unit 22 in FIG. 2), the power consumption becomes: $p_{hi}=e\rho cQ_i(T_{iout}-T_A)$ if the terminal is heating and $p_{hi}=0$ if the terminal is not heating. Similarly, for the cooling coil 27 in terminal unit 22 number i served by the AHU 12, the power consumption becomes $p_{ci}=e\rho cQ_i(T_{iout}-T_A)$ if the terminal is cooling and $p_{ci}=0$ if the terminal is not cooling.

Since the heat transfer function is assumed to represent power consumption, the slope of the power consumed with respect to a change in supply air temperature is: $dpi/dTA=-e\rho cQ_i$ if the terminal unit 22 is heating, $dp_i/dT_A=0$ if the terminal unit 22 is not heating. Defining $Q_{hi}=Q_i$ if the terminal is heating and 0 if it's not, provides $dp_i/dT_A=-e\rho cQ_{hi}$. Similarly, for cooling, $dp_i/dT_A=-e\rho cQ_{ci}$.

The slope of power consumption as a function of temperature $(dp_i/dT_A)$ is proportional to the flow rate Q. If e$\rho$c is constant, then the slope with respect to a change in supply temperature of power consumed by the heating coil 26 in the terminal unit 22 number i is proportional the heated air flow: $dp_i/dT_A$ is proportional to $Q_{hi}$. Similarly, the slope of power consumption as a function of temperature for cooling and in the AHU 12 is proportional to the airflow.

The total power consumed by all the heating coils is the sum of the values for the individual heating coils 16, 26: $p_{hsum}=\Sigma e\rho cQ_{hi}(T_{iout}-T_A)$. The slope of the total power consumed by heating coils in all the terminals with respect to a change in supply air temperature is: $dp_{hsum}/dT_A=-\Sigma-e\rho cQ_{hi}=-e\rho c \Sigma Q_{hi}$. The slope of the total power consumed by heating coils 16, 26 is proportional to the sum of the values of the heated air flow, represented as $dp_{hsum}/dT_A$ is proportional to $\Sigma Q_{hi}$. The same analysis applies to cooling coils in the terminals units 22 and the AHU 12, providing: $dp_{csum}/dT_A$ is proportional to $\Sigma Q_{ci}$. Positive and/or negative numbers are summed, and the sum as a function of AHU temperature provides the slope.

The flow rates indicate the slopes of the power consumption. By measuring the flow rates, the slopes of power or energy as a function of temperature is given.

The heating sum and the cooling sum have opposite signs since the slopes are in different directions. The heating sum includes the heating coils 16 of the AHU 12 and the heating coils 26 of the terminal units 22. The cooling sum includes the cooling coils 17 of the AHU 12 and the cooling coils 27 of the terminal units 22.

For the slope of the total energy use with respect to change in the supply air temperature of the system, the heating and cooling slopes are added together. The flows are added with efficiency factors applied to weight energy consumption by component efficiency. Since the AHU 12 and terminal units 22 have opposite effects, the opposite signs for heating and cooling flows at the terminal units 22 is reversed from heating and cooling at the AHU 12.

In addition or instead of collecting data indicating the quantity of air being heated and cooled at the terminals, the controller 14 might collect an indication of where the energy consumption breakpoints 40 occur. The breakpoints 40 correspond to the temperature set points of the terminal units 22 and the temperature of the outside air be mixed by AHU 12. The breakpoints 40 in the total energy curve correspond to major breakpoints in the terminal controllers 24: the points where reheating starts or stops. Breakpoints 40 may instead be indicated by the quantity of air that would be conditioned at the terminal unit 22 if the supply air temperature changes by some other selected amount. For example, the breakpoint 40 is found by determining whether a terminal unit 22 would still reheat if the supply air was 2 degrees warmer. The breakpoints 40 corresponding to the optimized supply air temperature are then identified. Once identified, the HVAC system may be operated on each side of one or more breakpoints 40 to identify the least slope magnitude.

The controller 14 is configured to set the AHU temperature based on the slope. The smaller slopes correspond to more optimized operation of the system. A zero slope of the total energy is the optimized operation or energy consumption. If the total slope is zero or nearly (e.g., within 0.2) zero, the system is operating at the minimum or nearly minimum energy point. The supply air temperature is maintained or set to a current temperature where the slope is 0 or within a threshold tolerance of 0.

There may be multiple zero or low slope regions, so false minimums may be avoided by testing operation starting with random or spaced apart (e.g., cold, hot, and medium) starting points for the air supply temperature.

The controller 14 is configured to adjust the supply air temperature up where the slope is negative or negative with a magnitude above the tolerance threshold. If the total slope is negative, the supply air temperature is too low and adjusted upward. For example, from FIG. 2, if the AHU supply air temperature is at 60 degrees, the slope is negative so the AHU supply air temperature is increased. The controller 14 is configured to adjust the supply air temperature down where the slope is positive or positive with a magnitude above the tolerance threshold. If the total slope is positive, the supply air temperature is too high and is adjusted downward. For example, from FIG. 2, if the AHU supply air temperature is at 73 degrees, the slope is positive so the AHU supply air temperature is decreased.

The setting may continue to find the optimized slope. The power consumed at each coil is added to see how that changes with a change in the temperature of air supplied by the air handler. For an increase in supply air temperature, cooling power at the air handler goes down, heating power at the air handler goes up, cooling power at the terminals goes up, and heating power at the terminals goes down. By reading the air flow resulting from a current setting, the slope is determined again. The setting is performed again until the current setting is maintained.

The step size or amount of adjustment in setting may be a default amount, such as 1, 2, or 3 degrees. The amount may be programmed or selected by a user. In one embodiment, the amount of adjustment is based on a magnitude of the slope. The size or rate of the supply air temperature adjustment relates to the magnitude of the total slope. For example, an amount of adjustment would be larger for a supply air temperature of 50-52 degrees than for 53-65 degrees. Any resolution may be used, such as providing for two or more step sizes mapped to two or more ranges of slope magnitudes.

FIG. 3 shows one embodiment of a method for optimizing HVAC. The flow rates over heating and cooling components in the HVAC system are used to determine a slope of power consumption as a function of air supply temperature or humidity. The slope is used to adjust the air supply temperature or humidity, optimizing energy consumption of the HVAC system.

The method is implemented by the system of FIG. 1, the controller 14, a server, a computer, a panel, a workstation, or another device. For example, the controller 14 receives air flow rates from a communications interface or a memory. The controller 14 calculates the slope and adjusts the setting for the AHU supplied air. The AHU 12 and/or terminals 22 condition the air based on the setting for the AHU supplied air.

The method is performed in the order shown or other order. For example, act 58 is performed while performing the other acts. Additional, different, or fewer acts may be provided. For example, acts for establishing the set points or measuring outside air temperature are provided.

In act 52, the controller 52 receives an amount of air used for heating or cooling for each terminal unit 22 supplied air by the AHU 12. The amount of air used for heating or cooling by the AHU 12 is also received. Any measure of the amount of air to provide the desired amount of heating or cooling may be used. For example, an air flow rate and whether being used to heat or cool is received from each terminal unit 22 and the AHU 12. The sensors 19, 29 measure operation of the air handling in the HVAC system. The controller 14 may collect or store additional information, such as set points.

The measurements and/or other data are transmitted to the controller 14. The transmission is of any of the data at once or over time. The transmissions for later times may transmit just data that has changed. The transmission is wired or wireless. The transmission is direct or over a network. In one embodiment, the transmission is by access or looking up the data by the controller 14 in a memory. Any transmission format may be used. The transmission provides the measured amount of air for heating and cooling to be used by the controller 14.

In act 54, the controller 14 calculates a slope of energy use of the terminal units 22 and the AHU 12. The heat transfer function indicates the energy used to transfer heat or cold to the supply air from the AHU 12 and to the air output to the occupant space by the terminal units 22. Where the change in temperature of the supply air from the AHU 12 is optimized, the slope is for a change in temperature. Using the heat transfer function, the slope is given by the amount of air flow needed to achieve the heat transfer. The slope of energy use is calculated from the amounts of air, such as a sum of the flow rates from the different cooling and heating coils 16, 26, 17, 27. The controller 14 calculates the slope as a sum of efficiency weighted heating and cooling slopes. The heating slope is a sum of amounts of air for terminal units 22 heating the air, and the cooling slope is a sum of amounts of air for terminal units 22 cooling the air. The slope corresponding to the amount of air for heating or cooling by the AHU 12 is also included in the heating or cooling sum. Alternatively, the total air flow from all heating and cooling devices is summed.

In one embodiment, the calculation of slope of energy use of the total system is separated into a sub-process or processes for calculating the air flow of each terminal unit in the system and another sub-process for calculating the air flow for the AHU controlling such terminal units. Another sub-process determines the total energy consumption. Other approaches may be used, such as calculating different slopes for the terminal units and AHU, and then calculating a total slope. There also may be a decision made by the controller depending on the heating and cooling slopes of the terminal units or other factors for deriving the optimized slope of energy use of the system.

The slope may be calculated using efficiency factors (e.g., by heating, cooling, and/or coil). The power resulting from a change in temperature may be weighted by efficiency in making that change in temperature. Different efficiency may be assigned for heating verses cooling, for AHU 12 verses terminal unit 22, and/or by individual heating and cooling coils 16, 26, 17, 27.

In act 56, the controller 14 adjusts an air supply temperature or humidity of the AHU 12 based on the slope. The set point for the temperature or humidity of the air being output from the AHU 12 to the terminal units 22 is set to the same or different value. The air supply temperature of the air handling unit is decreased when the slope is positive and increased when the slope is negative. Where the slope is zero or substantially (e.g., 0.3 to −0.3) zero, the set point is maintained at a same value.

The slope is used to see how the power consumed changes with a change in the temperature or humidity of air supplied by the air handler unit 12. For example, the temperature of the AHU supplied air to the terminal units 22 is controlled for optimization. For an increase in supply air temperature, the cooling power at the air handler goes down, the heating power at the air handler goes up, the cooling power at the terminals goes up, and/or the heating power at the terminals goes down. The slope indicates whether to increase or to provide the opposite changes with a decrease in the temperature of the AHU supplied air.

In act 58, the air provided to occupants is conditioned. The air supplied by the AHU 12 is conditioned. The terminal units 22 heat or cool the air to a set point. Due to the optimization of the temperature of the air supplied by the AHU 12, the total energy usage of the system 10 is optimized. Each given terminal unit 22 may have a greater or lesser change in temperature of the air across the heating or cooling coils due to the optimization.

The AHU 12 outputs air at the temperature or humidity established based on the slope of energy consumption as measured from the amount of air flow in the system components. One or more terminal units 22 may further condition the air to a temperature or humidity specific to the corresponding occupant space. For example, some terminal units heat the air to some different set points higher than the temperature of the AHU supply air, and some other terminals cool the air to some different set points lower than the temperature of the AHU supply air. The conditioned air is output to the zones corresponding to the terminal units 22.

Using the slope of energy consumption based on measurements of amount of air flow, the energy consumption of the HVAC system is optimized with respect to the controlled variable. For example, the temperature of the air conditioned by the AHU 12 is set to a level providing for a minimum or reduced compared to other levels amount of energy consumption. The energy consumption is represented by the heat transfer since the energy is being consumed to transfer heat or cold at the AHU 12 and/or terminal units 22. Different set points and/or outside air temperature may result in different temperatures or levels being optimum or better than others.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A control system for heating, ventilation, and air conditioning (HVAC), the control system comprising:
   an air-handling unit (AHU) comprising an AHU heating coil and an AHU cooling coil, the AHU configured to output supply air at an AHU temperature;
   a terminal unit having a terminal flow rate sensor and having terminal heating and/or terminal cooling coils, the terminal unit connected with the air handling unit by a duct for receiving the supply air from the AHU;
   a controller configured to receive a flow rate from the terminal flow rate sensor, calculate a slope of power consumption based on the flow rate, and set the AHU temperature based on the slope.

2. The control system of claim 1 wherein the AHU is connected to receive outside air from outside of a building and is configured to heat or cool the outside air in accordance with the AHU temperature as set based on the slope to generate the supply air, and wherein the terminal unit has an air output connected to an occupant area and is configured to heat or cool the supply air based on a temperature set point for the occupant area.

3. The control system of claim 1 wherein the AHU includes the controller.

4. The control system of claim 1 wherein the terminal unit is one of a plurality of terminal units, which are group members with the AHU and the AHU is a group master, and wherein each terminal unit is configured to communicate the respective flow rate from the respective terminal unit as one of the group members.

5. The control system of claim 1 wherein the controller is configured to calculate the slope in response to a change in an outside air temperature or a change in a temperature set point for one or more of the terminal units.

6. The control system of claim 1 wherein the controller is configured to calculate the slope as a sum of flow rates.

7. The control system of claim 1 wherein the controller is configured to calculate the slope from a heating sum of the flow rates for heating and a cooling sum of the flow rates for cooling.

8. The control system of claim 7 wherein the controller is configured to calculate the slope as a sum of the heating sum and the cooling sum.

9. The control system of claim 7 wherein the heating sum is a function of a heating efficiency factor and the cooling sum is a function of a cooling efficiency factor, the heating efficiency factor different than the cooling efficiency factor.

10. The control system of claim 9 wherein the slope is a function of an AHU efficiency factor, the AHU efficiency factor different than the heating and cooling efficiency factors.

11. The control system of claim 1 wherein the controller is configured to set the AHU temperature at a current temperature where the slope is 0, adjust the AHU temperature down where the slope is negative, and adjust the AHU temperature up where the slope is positive.

12. The control system of claim 1 wherein the controller is configured to set the AHU temperature with an amount of adjustment based on a magnitude of the slope.

13. The control system of claim 1 wherein the terminal unit is one of a plurality of terminal units connected by ducts to the AHU to receive the supply air from the AHU, and wherein the controller is configured to calculate the slope of the power consumption from the respective flow rates from respective terminal flow rate sensors and from a flow rate for the AHU.

14. A method for optimizing heating, ventilation, and air conditioning (HVAC), the method comprising:
   receiving an amount of air used for heating or cooling for each terminal supplied air by an air handling unit;
   calculating a slope of energy use of the terminals and the air handling unit as a function of air supply temperature or humidity, the slope being a function of the amounts of air; and
   adjusting the air supply temperature or humidity of the air handling unit based on the slope.

15. The method of claim 14 wherein receiving the amount of air for each terminal comprises receiving an air flow rate for each terminal and receiving an indication of whether each terminal is heating or cooling the air from the air handling unit.

16. The method of claim 14 wherein calculating the slope comprises calculating the slope as a sum of a heating slope and a cooling slope, the heating slope being for terminals heating the air and the cooling slope being for terminals cooling the air.

17. The method of claim 14 wherein calculating the slope comprises calculating as a function of an efficiency factor.

18. The method of claim 17 wherein the efficiency factor is one of a heating, cooling, or coil efficiency factor.

19. The method of claim 14 wherein adjusting comprises decreasing the air supply temperature of the air handling unit when the slope is positive and increasing the air supply temperature when the slope is negative.

20. A control system for heating, ventilation, and air conditioning (HVAC), the control system comprising:
   an air-handling unit (AHU) having an AHU flow rate sensor, AHU heating coil, and an AHU cooling coil, the AHU configured to supply air at an AHU temperature to terminals; and
   a controller configured to receive flow rates from the AHU flow rate sensor and from terminal flow rate sensors, calculate a slope of power consumption based on the flow rates, and set the AHU temperature based on the slope.

21. The control system of claim 20 wherein the controller is configured to calculate the slope as a sum of a heating sum of the flow rates for heating and a cooling sum of the flow rates for cooling.

22. The control system of claim 20 wherein the controller is configured to set the AHU temperature as an adjustment of the AHU temperature down where the slope is negative and an adjustment the AHU temperature up where the slope is positive.

* * * * *